May 19, 1953 J. W. PHILLIPS 2,638,695
KITE FLOAT FOR THE ROPES OF FISHING NETS
Filed Dec. 15, 1950 3 Sheets-Sheet 1

INVENTOR
JOHN W. PHILLIPS
By Francis E. Boyce
Attorney

May 19, 1953  J. W. PHILLIPS  2,638,695
KITE FLOAT FOR THE ROPES OF FISHING NETS
Filed Dec. 15, 1950  3 Sheets-Sheet 2

INVENTOR
JOHN W. PHILLIPS
By Francis O. Boyce
Attorney

May 19, 1953    J. W. PHILLIPS    2,638,695
KITE FLOAT FOR THE ROPES OF FISHING NETS
Filed Dec. 15, 1950    3 Sheets-Sheet 3

INVENTOR
JOHN W. PHILLIPS
By Francis E. Boyce
Attorney

Patented May 19, 1953

2,638,695

UNITED STATES PATENT OFFICE 2,638,695

KITE FLOAT FOR THE HEAD ROPES OF FISHING NETS

John W. Phillips, Osgodby, near Lincoln, England

Application December 15, 1950, Serial No. 200,935
In Great Britain July 7, 1950

4 Claims. (Cl. 43—9)

This invention relates to kite floats for the headropes of trawl and similar fishing nets, and its object is to provide a kite float which on being towed exerts a very effective lifting effect on the headrope to which it is attached.

The kite float according to the present invention consists of a plurality of hollow float bodies, a web with a freely exposed concave under surface extending between and rigidly interconnecting the hollow float bodies, and below said web means of longitudinally separated attachment of the kite float to the headrope of a fishing net.

The hollow float bodies may each be substantially spherical, or substantially cylindrical and coaxial, and made of metal, for instance cast aluminum alloy, or sheet steel hardened by heat treatment.

The web may be a downwardly concave upwardly convex concavo-convex thin metal web interconnecting the hollow float bodies.

More than two hollow float bodies can be interconnected by downwardly concave webs.

A downwardly concave concavo-convex web curved to the radius of spherical or coaxial cylindrical hollow float bodies between which it extends, may be located to extend from and interconnect the curved top surfaces of the two hollow float bodies.

Alternatively, the downwardly concave concavo-convex web may be located below the top of the hollow float bodies, either above or below the equatorial plane of the hollow float bodies.

The downwardly concave web by extending between the hollow float bodies is masked by such bodies from fouling the quarter rope or other rope of a trawl net. Even should the kite float become entangled with and held in the mouth of the net, the web is guarded by the hollow float bodies from chafing and cutting the meshes of the net, under the powerful lift exerted within the net by the web when the kite float is towed, during trawling.

Representative examples of kite floats according to the invention, are shown in the accompanying drawings, in which.

Figure 1:
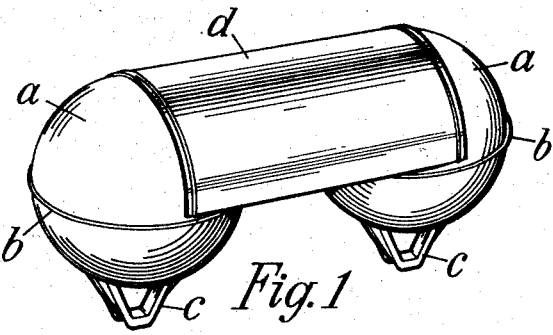
Fig. 1 is a perspective view of a kite float composed of two spherical hollow float bodies interconnected by a downwardly concave concavo-convex web located at the top of the hollow float bodies.
Figure 2:
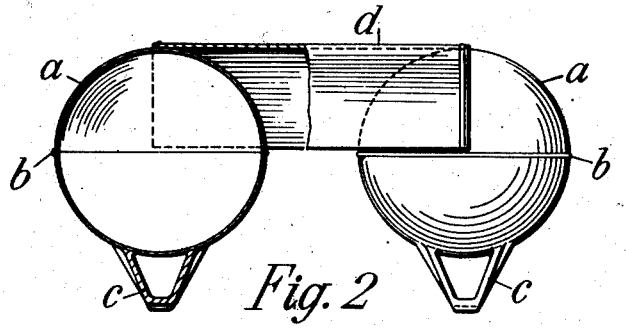
Fig. 2 is a part side elevation and part sectional elevation thereof.

Referring more particularly to Figs. 1 and 2, $a$ are two spherical hollow metal float bodies, each composed of two hemispherical cups of cast seawater-resistant aluminium alloy, joined together at their mouths by an equatorial welded joint $b$.

The lower cup of each spherical float body $a$ has an eyed bracket $c$ cast centrally thereon, wherewith the two hollow float bodies $a$ can be lashed to the headrope of a trawl or similar fishing net, or through which a rope can be threaded, forming a string of floats which can be lashed to the headrope at intervals.

$d$ is a downwardly concave concavo-convex thin metal web curved to the radius of the two spherical hollow metal float bodies $a$, and extending between them and welded at its respective ends to the top of each. The web $d$ may, however, be located above the top of the hollow float bodies $a$ but spaced by flanges or otherwise somewhat away therefrom.

Figure 3:
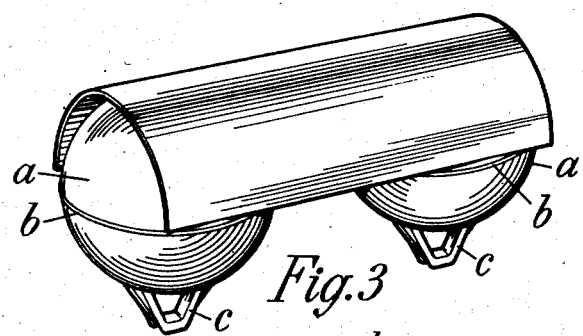
Figs. 3 and 4 are views similar to Figs. 1 and 2 but showing a slight modification.
Figure 4:
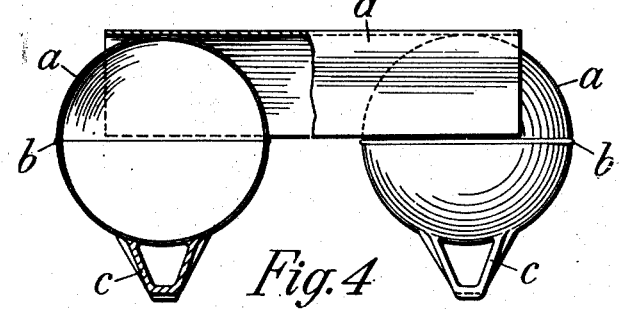

In the construction of kite float shown in Figs. 1 and 2, the downwardly concave web $d$ extends at its ends only to the vertical axes of the two hollow float bodies $a$. However, the downwardly concave web $d$ may extend further over the hollow float bodies $a$, as shown in Figs. 3 and 4, although in order to avoid any external projection of the ends of the web $d$ which would be liable to become entangled with a rope or the net, it is desirable that the ends of the web $d$ should not project beyond the equatorial region of the hollow float bodies $a$.

Figure 5:
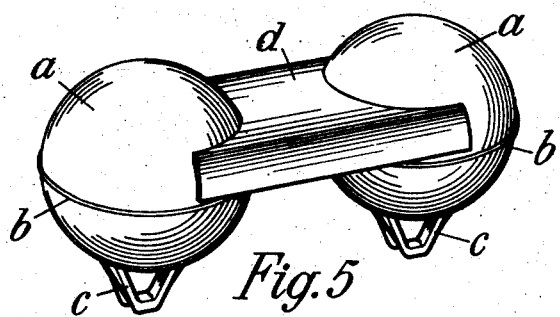
Figs. 5 and 6 are views similar to Figs. 1 and 2, but showing the web located below the top of the hollow float bodies and above the equatorial plane thereof.
Figure 6:
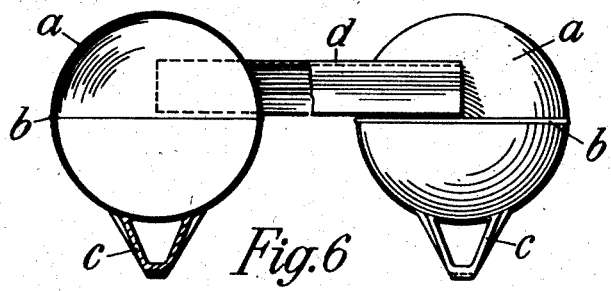
Figure 7:
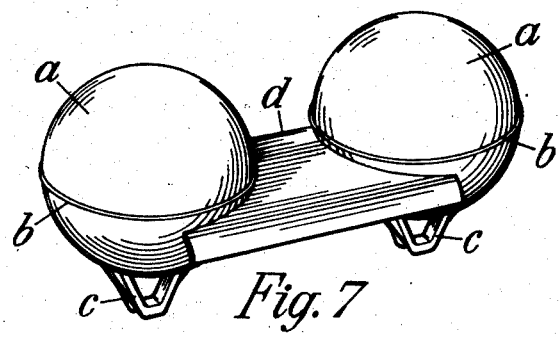
Figs. 7 and 8 are views similar to Figs. 1 and 2, but showing the web located below the equatorial plane of the hollow float bodies.
Figure 8:
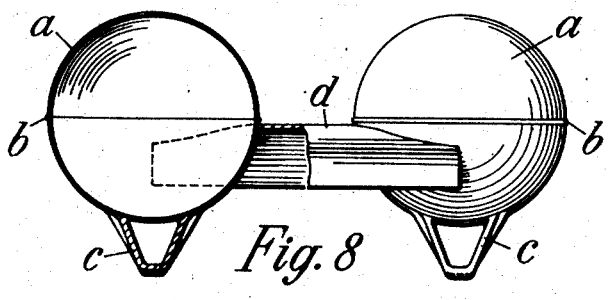

Instead of the downwardly concave web $d$ being located at and embracing the top of the hollow float bodies $a$, it can be located and be welded lower, either above the equatorial plane of the hollow float bodies $a$ as shown in Figs. 5 and 6, or below the equatorial plane as shown in Figs. 7 and 8.

The downwardly concave web $d$ could be located to extend downwards across the actual equatorial plane of the hollow float bodies $a$, but this is inconvenient as the ends of the web $d$ would require more complex shaping than when entirely above or entirely below the equatorial plane. Obviously the arrangement of the downwardly concave web $d$ on and fitting the top of the hollow float bodies $a$ and terminating at their vertical axes, is most convenient, as the edges of the ends of the web $d$ whilst being simply transverse are exposed for direct welding to the hollow float bodies $a$.

Figure 9:
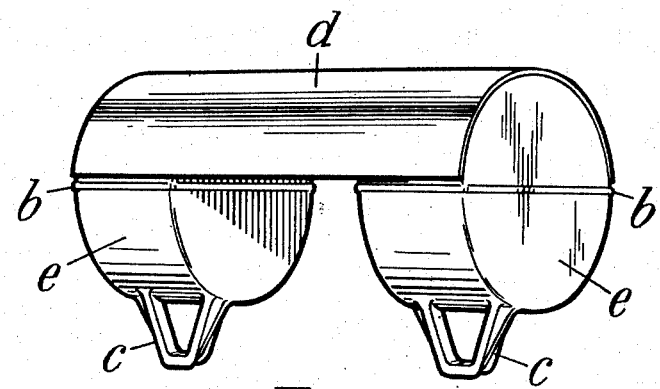
Fig. 9 and 10 are views similar to Figs. 1 and 2, but showing coaxial cylindrical hollow float bodies.
Figure 10:
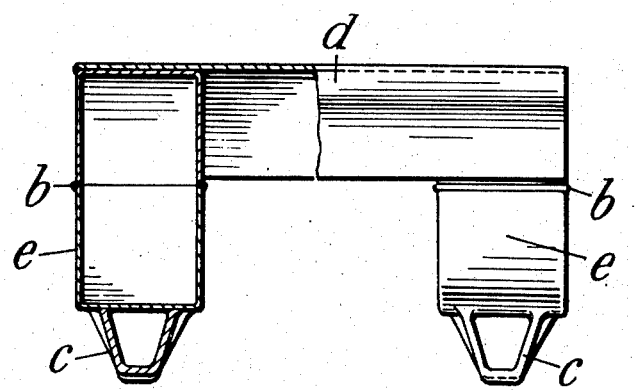

Instead of the hollow float bodies being spherical, they can be coaxial cylinders $e$ as shown in Figs. 8 and 9. This construction of kite float here shown is otherwise similar to that shown in Figs. 1 and 2.

These kite floats are intended for attachment to the headrope at the bosom portion of a trawl net, at which position the longitudinal separation of the two eyed brackets $c$ will ensure that the web $d$ is presented substantially transversely to the direction of towing.

In all the constructions shown in the drawings the downwardly concave web $d$ is effectively masked by the hollow float bodies $a$ or $e$, when the eyes $b$ of both float bodies are attached to the headrope of a trawl net. The web $d$ is thus unlikely to foul the quarter or other rope, and even if the entire kite float should become entangled in the mouth of the net, the web $d$ is guarded by the float bodies $a$ or $e$ against chafing and cutting through the meshes of the net. Also the web $d$ is symmetrical on either side of the vertical plane through the common axis of the coaxial float bodies $a$ or $e$ and the eyes $c$ for attachment of the latter to the headrope. This symmetry causes the kite float to be suitable for attachment to the headrope either side forward with respect to the direction of trawling.

I claim:

1. A kite float for the headrope of a trawl net, consisting of a plurality of coaxial hollow metal float bodies of circular vertical cross section, means at the bottom of said float bodies of longitudinally separated attachment of said float bodies to the headrope of a trawl net, and a downwardly concave upwardly convex rigid metal web extending between and secured to said float bodies, said web being symmetrical on either side of the vertical plane through the common axis of said float bodies and said means of attachment whereby the kite float is suitable for attachment to the headrope, either side forward with respect to the direction of trawling.

2. A kite float for the headrope of a trawl net, consisting of a plurality of coaxial substantially spherical hollow float bodies, means at the bottom of said float bodies of longitudinally separated attachment of said float bodies to the headrope of a trawl net, and a downwardly concave upwardly convex rigid metal web extending between and secured to the top of said float bodies, said web being symmetrical on either side of the vertical plane through the common axis of said float bodies and said means of attachment whereby the kite float is suitable for attachment to the headrope, either side forward with respect to the direction of trawling.

3. A kite float for the headrope of a trawl net, consisting of two coaxial substantially spherical hollow metal float bodies, means at the bottom of said float bodies of longitudinally separated attachment of said float bodies to the headrope of a trawl net, and a downwardly concave upwardly convex rigid metal web extending between and secured to and between the top and bottom of said float bodies, said web being symmetrical on either side of the vertical plane through the common axis of said float bodies and said means of attachment whereby the kite float is suitable for attachment to the headrope, either side forward with respect to the direction of trawling.

4. A kite float for the headrope of a trawl net, consisting of a plurality of coaxial substantially cylindrical hollow metal float bodies, means at the bottom of said float bodies of longitudinally separated attachment of said float bodies to the headrope of a trawl net, and a downwardly concave upwardly convex rigid metal web extending between and secured to said float bodies, said web being symmetrical on either side of the vertical plane through the common axis of said float bodies and said means of attachment whereby the kite float is suitable for attachment to the headrope, either side forward with respect to the direction of trawling.

JOHN W. PHILLIPS.

References Cited in the file of this patent

UNITED STATES PATENTS

| Number | Name | Date |
|---|---|---|
| D. 151,242 | Jones | Oct. 5, 1948 |
| 739,324 | Koenig | Sept. 22, 1903 |
| 1,567,555 | Straussler | Dec. 29, 1925 |
| 2,327,789 | Hixon | Aug. 24, 1943 |

FOREIGN PATENTS

| Number | Country | Date |
|---|---|---|
| 4,565 | Great Britain | Nov. 6, 1880 |